（12）United States Patent
Van Der Weij

(10) Patent No.: US 10,448,785 B2
(45) Date of Patent: Oct. 22, 2019

(54) APPARATUS FOR PREPARING FOOD AND AIR GUIDE MEMBER THEREFOR

(75) Inventor: Fedde Van Der Weij, Almere (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 647 days.

(21) Appl. No.: 13/119,803

(22) PCT Filed: Sep. 23, 2008

(86) PCT No.: PCT/EP2008/062673
§ 371 (c)(1),
(2), (4) Date: Jun. 3, 2011

(87) PCT Pub. No.: WO2010/034338
PCT Pub. Date: Apr. 1, 2010

(65) Prior Publication Data
US 2012/0125313 A1 May 24, 2012

(51) Int. Cl.
A21B 1/00 (2006.01)
A47J 37/06 (2006.01)
F24C 15/32 (2006.01)

(52) U.S. Cl.
CPC ......... *A47J 37/0641* (2013.01); *F24C 15/322* (2013.01)

(58) Field of Classification Search
CPC .. A47J 37/0641; A47J 37/0623; F24C 15/322

(Continued)

(56) References Cited

U.S. PATENT DOCUMENTS 2,966,573 A * 12/1960 Hansen .................. 219/400
3,614,388 A * 10/1971 Robinson ................ 219/400

(Continued)

FOREIGN PATENT DOCUMENTS

EP 1867264 A 12/2007
EP 1867264 A1 * 12/2007 .......... A47J 37/0623

(Continued)

OTHER PUBLICATIONS

International Search Report of the European Patent Office Patent Office in counterpart foreign application No. PCT/EP2008/062673 filed Sep. 23, 2008.

(Continued)

Primary Examiner — Alfred Basichas

(57) ABSTRACT

An apparatus for preparing food comprises a food preparation chamber with an air-permeable bottom wall and an upper air discharge opening, a fan for moving hot air successively through the bottom wall, the food preparation chamber and the discharge opening, an air channel for returning the air from the discharge opening towards the bottom wall separate from the food preparation chamber, a heat radiator positioned in the upper part of the food preparation chamber and an air guide below the food preparation chamber and on top of a bottom part for directing the air flow essentially upwards into food present in the food preparation chamber. Said air guide comprises at least one air guide rib arranged along a curved line extending substantially towards a central region of said bottom part, wherein said air guide rib is provided with a concave side which, as seen in a vertical section through said air guide rib, along at least part of its extension along said curved line includes an angle with the bottom part smaller than 90°.

15 Claims, 3 Drawing Sheets

(58) Field of Classification Search
USPC ................. 126/21 R, 21 A; 219/400
See application file for complete search history.

(56) References Cited

U.S. PATENT DOCUMENTS

| | | | | |
|---|---|---|---|---|
| 3,719,180 | A * | 3/1973 | Pere .................. | 126/21 A |
| 3,783,832 | A * | 1/1974 | Marsh ................ | 119/319 |
| 3,820,525 | A * | 6/1974 | Pond ................. | 126/21 A |
| 3,828,760 | A * | 8/1974 | Farber et al. ........ | 126/21 A |
| 4,010,341 | A * | 3/1977 | Ishammar ........... | F24C 15/322 |
| | | | | 126/21 A |
| 4,068,572 | A * | 1/1978 | Vogt .................. | A47J 39/003 |
| | | | | 219/400 |
| 4,132,216 | A * | 1/1979 | Guibert .............. | F25D 25/00 |
| | | | | 126/21 A |
| 4,374,318 | A * | 2/1983 | Gilliom .............. | A47J 37/0623 |
| | | | | 126/21 A |
| 4,374,319 | A * | 2/1983 | Guibert .............. | 219/400 |
| 4,378,729 | A * | 4/1983 | Pierick .............. | 99/400 |
| 4,384,513 | A * | 5/1983 | Pierick .............. | 99/400 |
| 4,426,923 | A * | 1/1984 | Ohata ................ | A47J 39/003 |
| | | | | 126/20 |
| 4,464,406 | A * | 8/1984 | Pierick .............. | 426/496 |
| 4,591,698 | A * | 5/1986 | Chang ................ | A47J 37/015 |
| | | | | 219/386 |
| 4,728,762 | A * | 3/1988 | Roth et al. .......... | 219/730 |
| 4,771,162 | A * | 9/1988 | Schatz ............... | A61C 13/14 |
| | | | | 126/21 A |
| 5,481,962 | A * | 1/1996 | Tedesco ............. | A23L 1/1815 |
| | | | | 126/21 A |
| 5,676,870 | A * | 10/1997 | Wassman et al. ..... | 219/400 |
| 5,881,636 | A | 3/1999 | Sweet | |
| 8,011,293 | B2 * | 9/2011 | McFadden ......... | A21B 1/245 |
| | | | | 126/21 A |
| 8,299,404 | B2 * | 10/2012 | Van Der Weij ..... | A47J 37/0623 |
| | | | | 126/21 A |
| 2005/0224064 | A1 * | 10/2005 | Stockley ............ | 126/21 R |
| 2006/0027560 | A1 * | 2/2006 | Song et al. .......... | 219/400 |
| 2007/0140844 | A1 * | 6/2007 | Yoshida ............. | F04D 25/0613 |
| | | | | 415/220 |
| 2009/0013987 | A1 * | 1/2009 | Akdag et al. ........ | 126/21 A |
| 2009/0134140 | A1 * | 5/2009 | Van Der Weij ..... | A47J 37/0623 |
| | | | | 219/400 |
| 2012/0231138 | A1 * | 9/2012 | Poston et al. ........ | 426/520 |

FOREIGN PATENT DOCUMENTS

| | | | | |
|---|---|---|---|---|
| JP | 08117094 A | * | 5/1996 | ............ A47J 27/00 |
| JP | 2008256292 A | * | 10/2008 | |
| WO | WO 2008/080808 A | | 7/2008 | |
| WO | WO 2008080808 A1 | * | 7/2008 | ............ F24C 15/32 |

OTHER PUBLICATIONS

Written Opinion of the European Patent Office Patent Office in counterpart foreign application No. PCT/EP2008/062673 filed Sep. 23, 2008.

* cited by examiner

APPARATUS FOR PREPARING FOOD AND AIR GUIDE MEMBER THEREFOR

CROSS-REFERENCE TO RELATED APPLICATION

This application is a Section 371 National Stage Application of International Application PCT/EP2008/062673 filed Sep. 23, 2008 and published as WO/2010/034338 in English.

BACKGROUND

The discussion below is merely provided for general background information and is not intended to be used as an aid in determining the scope of the claimed subject matter.

An aspect of the invention relates to an apparatus for preparing food, comprising a food preparation chamber with an air-permeable bottom wall and an upper air discharge opening, a fan for moving hot air successively through the bottom wall, the food preparation chamber and the discharge opening, an air guide for returning the air from the discharge opening towards the bottom wall separate from the food preparation chamber, a heat radiator positioned in the upper part of the food preparation chamber and the air guide below the food preparation chamber and on top of a bottom part for directing the air flow essentially upwards into food present in the food preparation chamber An apparatus of this type provides a method for the preparation of food wherein the food is heated from below by convection (by means of the air flow) and from above by radiation (by the heat radiator) simultaneously. The air, which is heated by the heat radiator, circulates within the apparatus and prepares the food (frying, cooking).

In an apparatus which heats food by means of convection a substantial amount of heat is lost because the air flow looses a substantial amount of its energy due to resistance in the flow path. Moreover, in many known apparatus the air circulates without having been in contact with the food.

Apparatus exist in which the air only can follow a path along the food, and in such apparatus the heat transfer towards the food is improved because the heat transfer is determined by the amount of heat present in the air flow and the magnitude of the surface the air flow can contact within a specified period of time.

In known apparatus much of this energy is lost due to resistance of the air flow within the apparatus. This negatively influences the air flow, speed of preparation and baking quality.

In known apparatus the air flow pattern basically is vertical or cyclonic. Due to its high upward speed a vertical air flow is very effective because the air only follows a short path before again reaching the heat source. However, such a vertical air flow requires a vast amount of energy for diverting the air which has started to circulate by means of the fan. This results in a substantial loss of air flow, time and baking quality and requires much power for the fan. Of course this will lead to an increased power consumption.

In a cyclonic air flow pattern the rotation of the air flow, in a known apparatus, will be determined by the shape of the food preparation chamber. The air follows the inner wall, resulting in air flowing along said inner wall with a high circumferential velocity, whereas in a central column the air substantially is static. The upward velocity of the air is minimal. This provides large differences in baking result between food present in a central area of the food preparation chamber and food present along the inner wall. Although a cyclonic air flow pattern requires much kinetic energy, it results in a worse and less consistant result.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Thus, in accordance with an aspect of the present invention said air guide comprises at least one air guide rib arranged along a curved line extending substantially towards a central region of said bottom part, wherein said air guide rib is provided with a concave side which, as seen in a vertical section through said air guide rib, along at least part of its extension along said curved line includes an angle with the bottom part smaller than 90°.

As a result of this specific configuration of the air guide an air flow pattern is created in the food preparation chamber which combines the advantages of a vertical air flow with the advantages of a cyclonic air flow: a high upward velocity and a low flow resistance. Furthermore, the high vertical velocity is combined with a centrally located core of rotating air. This results in a low air flow resistance and effective heat transfer with resulting equal distribution of heat, better baking results and shorter preparation times.

In one embodiment of the apparatus according to the present invention the angle varies along the extension of the air guide rib. For example the angle may decrease or increase towards said central region. Such a variation of the angle offers a means for, depending on the demands, creating the desired air flow pattern within the food preparation chamber.

Of course it is possible too, that the angle substantially remains equal along the extension of the air guide rib.

Preferably the apparatus is provided with more than one air guide rib. Such plurality of air guide ribs may be spaced equally in a circumferential direction. As a result air arriving from all sides will be diverted in a similar manner.

When more than one air guide rib are provided, these air guide ribs may meet at a central region. The air guide ribs may meet directly, or said air guide ribs at said central region merge into an additional, substantially cone shaped air guide member. Such cone shaped air guide member further adds to the creation of a beneficial air flow pattern within the food preparation chamber.

However, it is possible too, that the air guide ribs end short of the central region, thus do not connect to each other.

It is possible too, that the apparatus is provided with only one air guide rib. In such an embodiment of the apparatus generally the air will arrive from only one side.

Also in the case that only one air guide rib is provided, such an air guide rib may, at said central region, merge into an additional, substantially cone shaped air guide member. Although, preferably, each air guide rib extends continuously, it is also possible to provide an embodiment of the apparatus in which the air guide rib comprises a number of separate air guide plates arranged in a pattern approaching said curved line. At least some of said air guide plates may be straight or may be curved.

BRIEF DESCRIPTION OF THE DRAWINGS

Hereinafter aspects of the invention will be elucidated while referring to the drawings in which.

DETAILED DESCRIPTION

Figure 1:
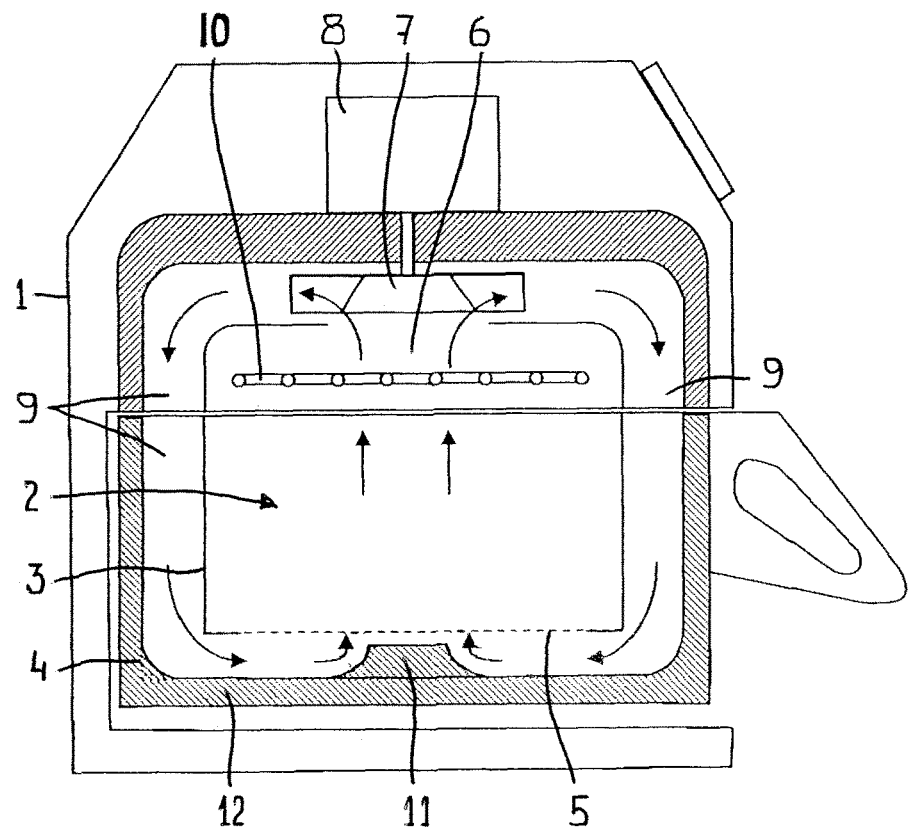
FIG. 1 shows an embodiment of the apparatus according to the invention in a schematical vertical cross-sectional view.

Referring to FIG. 1 the apparatus comprises an outer shell 1 which may be fabricated of a plastic material. Within said shell 1 a double-walled food preparation chamber 2 is defined surrounded by an inner wall 3 and an outer wall 4. In its bottom part the inner wall 3 is provided with an air-permeable bottom section 5. At its top, the inner wall is provided with a discharge opening 6 for air.

Above the discharge opening 6 a fan 7 is positioned which is driven by an electric motor 8 (of which the speed may be controllable). By means of the low pressure caused at one side of said fan 7 air is sucked from the food preparation chamber 2 through the discharge opening 6, and is delivered at a high pressure in a channel 9 defined between the inner wall 3 and outer wall 4. Thus the air is forced through said channel 9 towards and through the air-permeable bottom section 5 of the inner wall 3 to arrive again at the food preparation chamber 2.

It is noted that, although FIG. 1 suggests that the channel 9 between the inner wall 3 and outer wall 4 continuously surrounds the food preparation chamber 2 to define an annular channel, it also conceivable that there are a number of distinct channels (or only one local channel) leading from the fan 7 towards the bottom section 5.

In the upper part of the food preparation chamber one (or a number of) heat radiator 10 is positioned which not only radiates heat into the food preparation chamber and towards any food present therein, but also heats the air circulating in the apparatus and flowing upwardly past said heat radiator 10.

Thus, food in the food preparation chamber 2 is heated simultaneously in two different manners: by heat radiated from the heat radiator 10 and by the heated air passing the food from below.

Below the bottom section 5 sitting on a bottom part 12 is an air guide means 11 (only indicated schematically). The arrangement and/or shape of this air guide 11 (as will be elucidated later) is such that the arriving air is directed vertically upward with high velocity and in a rotating manner through the bottom section 5 and into the food preparation chamber 2 with a regular flow pattern. This means that the air guide 11 causes an essentially upwardly directed and rotating air flow along the food present in the food preparation chamber 2. As a result across the entire cross-section of the food preparation chamber 2 the interaction between the heated air and the food is optimised.

As shown schematically in FIG. 1, the bottom section 5 of the inner wall 3 of the food preparation chamber has, at least partly, an open structure, for example by being defined by a grid or mesh structure.

Next, reference is made to FIGS. 2-7 which show embodiments of the air guide 11. Firstly referring specifically to FIG. 2, the air guide 11 comprises four air guide ribs 13 arranged along a curved line extending substantially towards a central region of the bottom part 12. Each air guide rib 13 is provided with a concave side 14 which, as seen in a vertical section through said air guide rib 13, along at least part of its extension along said curved line includes an angle α with the bottom part smaller than 90°. In the embodiment according to FIG. 2 said angle α varies along the extension of the air guide ribs 13, such that at the outer part of the air guide ribs 13 angle α is larger than closer to the central region (where the air guide ribs 13 meet).

At said central region the air guide ribs 13 merge into an additional, substantially cone shape air guide member 15. This additional air guide member 15 tapers from the bottom part 12 upwardly.

Air arriving from channel 9 according to arrows 16 will be guided by the air guide ribs 13 and additional air guide member 15, such that a high vertical upward air flow velocity is obtained, combined with a small central core of rotating air.

Figure 2:
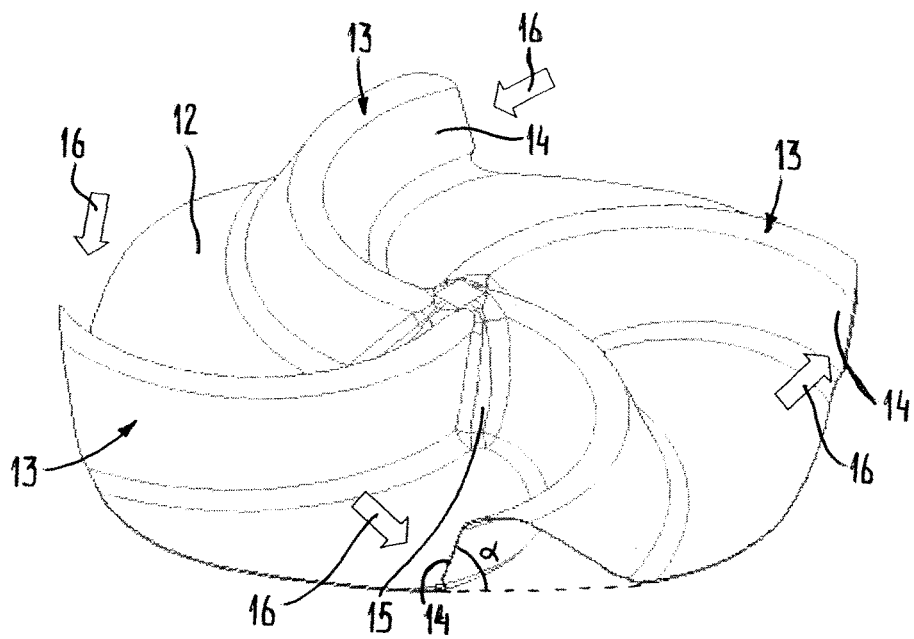
FIGS. 2-7 show, perspectively, embodiments of the air guide.
Figure 3:
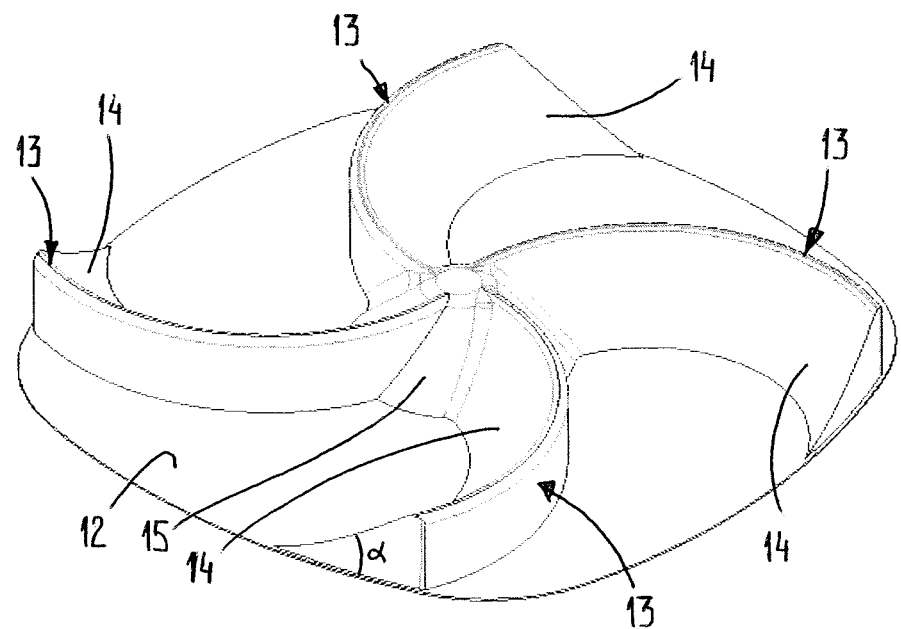

The embodiment according to FIG. 3 equals the embodiment according to FIG. 2, but in this instance the concave sides 14 of the air guide ribs 13 include an angle .alpha. with the bottom part 12 which remains substantially equal along the extension of said air guide ribs 13. As a result, in the embodiment according to FIG. 2 a higher upward air flow velocity will be obtained at the circumference of the food preparation chamber than in the embodiment according to FIG. 3.

Figure 4:
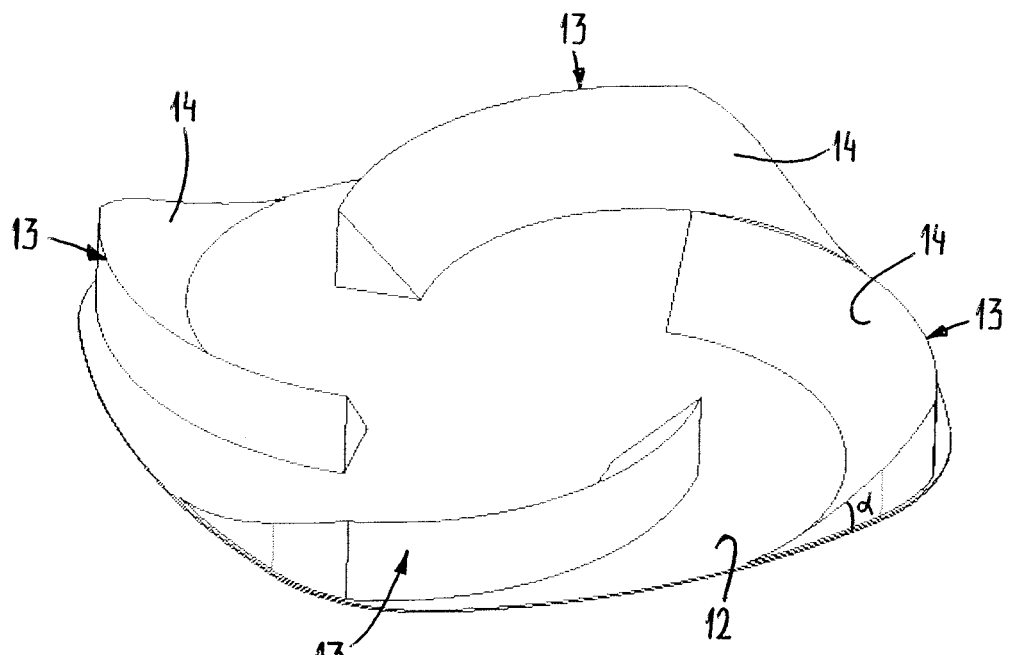

FIG. 4 shows an embodiment of the air guide comprising four air guide ribs 13 with concave sides 14 including an angle α with the bottom part 12 (again, this angle α may or may not vary). In this embodiment the air guide ribs 13 do not meet, but end short of the central region. As a result a rotating core of air is created in the central region which is larger than according to the previous embodiments, but which has a lower vertical air flow velocity.

Figure 5:
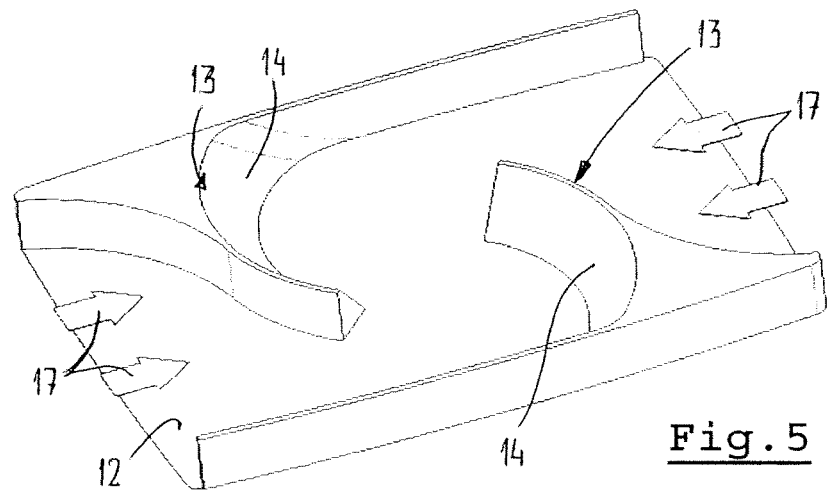

FIG. 5 shows an embodiment which is meant for diverting air arriving from two opposite directions according to arrows 17. Only two air guide ribs 13 are provided which define concave sides 14. As in the embodiment according to FIG. 4, the air guide ribs 13 do not meet but end short of the central region.

Figure 6:
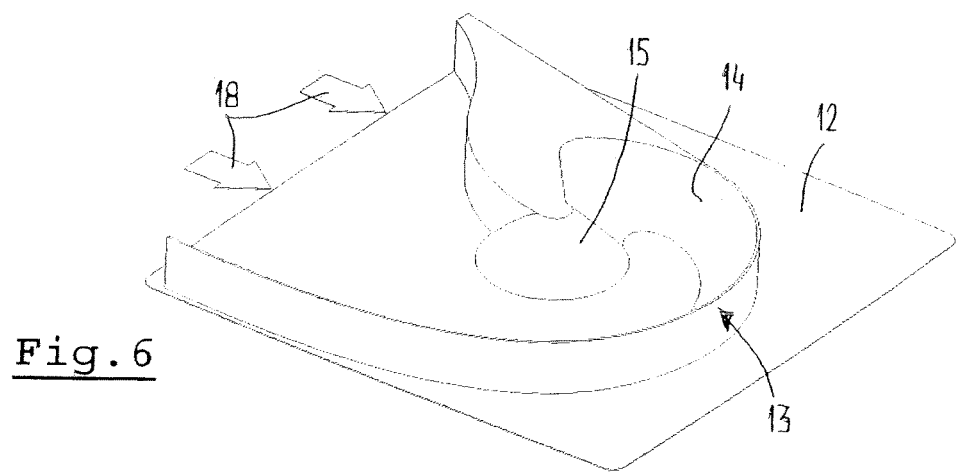

FIG. 6 shows an embodiment of the air guide comprising only one air guide rib 13 having a concave side 14. This embodiment of the air guide is meant for diverting an air flow which arrives from only one side (arrows 18). The air guide rib 13 according to FIG. 6 ends in an additional conical air guide member 15. Again, this air guide is effective in creating a flow pattern with a vertical air flow having at least a central rotating core.

Figure 7:
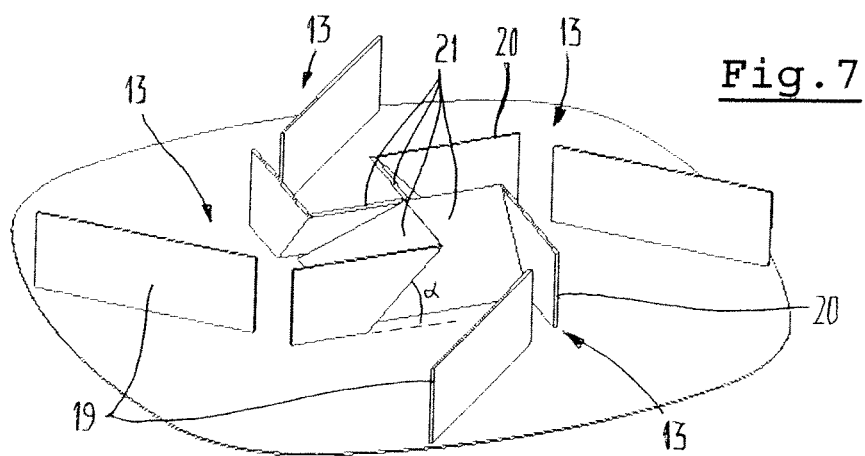

Finally FIG. 7 shows an air guide comprising 4 regularly spaced air guide ribs 13 each comprising a number of separate air guide plates 19, 20 and 21. Together, or in combination, these separate air guide plates are arranged in a pattern approaching the curved line as mentioned before. As such, a concave side of such a "combined" air guide rib 13 along at least part of its extension (specifically, at plate 21) includes an angle with the bottom part 12 smaller than 90°.

Although in FIG. 7 the air guide plates 19-21 are illustrated as being straight, it is possible too that these air guide plates are curved, such that the "combined" air guide rib 13 more closely approaches the optimal curved line. Further it is noted that it is conceivable too that said air guide plates are defined by integral upward extensions of the bottom part.

The invention is not limited to the embodiments described before which may be varied widely within the scope of the invention as defined by the appending claims.

The invention claimed is:

1. An apparatus for preparing food, comprising:
    a food preparation chamber with an air-permeable bottom wall and a top wall having an upper air discharge opening, the food preparation chamber configured to receive food above the air-permeable bottom wall;

a fan arranged to move air successively through the air-permeable bottom wall, the food preparation chamber and the upper air discharge opening;

an air channel arranged to return the air from the upper air discharge opening towards the air-permeable bottom wall separate from the food preparation chamber, the air channel being sealed with respect to the food preparation chamber along a length of the air channel extending from the top wall to the air-permeable bottom wall;

a heat radiator positioned in an upper part of the food preparation chamber; and an air guide positioned below the food preparation chamber and on top of a bottom part located below the air-permeable bottom wall, a lower part of the air channel directing air flow substantially radially toward the air guide, and the air guide directing the air flow essentially upwards into the food preparation chamber, wherein said air guide comprises at least one air guide rib arranged along a curved line extending substantially towards a central region of said bottom part, wherein said air guide rib is provided with a concave side which, as seen in a vertical section through said air guide rib, along at least part of its extension along said curved line includes an angle with the bottom part smaller than 90°.

2. The apparatus according to claim 1, wherein the angle varies along the extension of the air guide rib.

3. The apparatus according to claim 2, wherein the angle decreases towards said central region.

4. The apparatus according to claim 2, wherein the angle increases towards said central region.

5. The apparatus according to claim 1, wherein the angle substantially remains equal along the extension of the air guide rib.

6. The apparatus according to claim 1, wherein the at least one air guide rib includes a plurality of air guide ribs.

7. The apparatus according to claim 6, wherein air guide ribs of the plurality of air guide ribs are equally spaced in a circumferential direction.

8. The apparatus according to claim 6, wherein air guide ribs of the plurality of air guide ribs meet at the central region.

9. The apparatus according to claim 8, wherein the air guide ribs at said central region merge into a cone shaped air guide member.

10. The apparatus according to claim 6, wherein air guide ribs of the plurality of air guide ribs end short of the central region.

11. The apparatus according to claim 1, wherein the at least one air guide rib includes only one air guide rib.

12. The apparatus according to claim 11, wherein the only one air guide rib at said central region merges into a cone shaped air guide member.

13. The apparatus according to claim 1, wherein the at least one air guide rib comprises a number of separate air guide plates arranged in a pattern approaching said curved line.

14. The apparatus according to claim 13, wherein at least some of the number of separate air guide plates are straight.

15. The apparatus according to claim 13, wherein at least some of the number of separate air guide plates are curved.

* * * * *